United States Patent
Chen et al.

(10) Patent No.: US 8,388,211 B2
(45) Date of Patent: Mar. 5, 2013

(54) DISPLAY APPARATUS AND MANUFACTURING METHOD THEREOF

(75) Inventors: Chih Wei Chen, Hsin-Chu (TW); Hsu Sheng Hsu, Hsin-Chu (TW); Jia Lang Hsu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 415 days.

(21) Appl. No.: 12/710,711

(22) Filed: Feb. 23, 2010

(65) Prior Publication Data

US 2010/0246163 A1    Sep. 30, 2010

(30) Foreign Application Priority Data

Mar. 27, 2009   (TW) ............................... 98110068 A

(51) Int. Cl.
*F21V 7/04*    (2006.01)
*H01J 9/00*    (2006.01)

(52) U.S. Cl. .......... 362/633; 445/24; 362/632; 362/634; 362/615; 362/616; 362/628

(58) Field of Classification Search .................. 362/615, 362/16, 628, 632, 633, 634, 616
See application file for complete search history.

(56) References Cited

U.S. PATENT DOCUMENTS

| 6,426,763 | B1 | 7/2002 | Sagawa |
| 7,762,709 | B2 * | 7/2010 | Huang et al. .................. 362/633 |
| 2007/0008451 | A1 * | 1/2007 | Tanaka ............................ 349/58 |

FOREIGN PATENT DOCUMENTS

| JP | 2001-033677 | 2/2001 |
| JP | 2003-283890 | 10/2003 |
| JP | 2008-070484 | 3/2008 |
| TW | I274934 | 3/2007 |
| TW | I297805 | 6/2008 |

* cited by examiner

*Primary Examiner* — Stephen F Husar
*Assistant Examiner* — James Cranson, Jr.
(74) *Attorney, Agent, or Firm* — WPAT, P.C.; Anthony King

(57) ABSTRACT

A display apparatus includes a display panel and a light guide unit. The light guide unit includes a body portion and a support portion. The body portion includes a light outputting surface near the display panel, and the support portion is placed on the edge of the light outputting surface to support the display panel. The support portion has an inclined surface, and at least one groove is formed between the inclined surface and the display panel for accommodating glue that combines the display panel and the light guide unit. In addition to being disposed in the groove, glue may be further disposed in a gap between the display panel, a back bezel, and the light guide unit.

19 Claims, 5 Drawing Sheets

DISPLAY APPARATUS AND MANUFACTURING METHOD THEREOF

BACKGROUND OF THE INVENTION (A) Field of the Invention

The present invention relates to display panel technologies, and more specifically, to a display apparatus and the combination method thereof.

(B) Description of Related Art

Liquid crystal displays (LCD) have many advantages such as thin profile, light weight, low power consumption and low radiation, and therefore are widely used in current display applications. An LCD display primarily includes an LCD panel and a back light unit. The back light unit serves as an illumination source to the LCD panel, and the rotations of the liquid crystals are controlled by electrical signals so as to display images.

FIG. 1 shows a traditional display apparatus 10 including a display panel 11, a light guide unit 13 disposed below the display panel 11, a diffusion sheet 14 and a prism sheet 15 between the light guide unit 13 and the display panel 11, a reflection sheet 16 disposed below the light guide unit 13, and a back bezel 17. The light guide unit 13 evenly transmits light to the diffusion sheet 14, and the diffusion sheet 14 further scatters the light to provide evenly diffused light to the display panel 11. The prism sheet 15 is configured to increase brightness of the display apparatus 10 and modulate the level of light intensity, so as to obtain even light intensity distribution. The reflection sheet 16 reflects the light from the bottom of the light guide unit 13 back to the light guide unit 13, so as to increase the light utilization rate.

The display panel 11, the diffusion sheet 14, the prism sheet 15, the light guide unit 13 and the reflection sheet 16 are stacked as a laminate, and are fixed by the back bezel 17. The back bezel 17 encompasses the bottom and sides of the laminate, and bends and extends inwards at top. The extended portions are equivalent to the side frame. However, the inward extension portions of the back bezel 17 are not advantageous to meeting the current trend of narrowing the side frames.

As the portable mobile apparatus advances, in order to meet demands of artistic appearance and miniature size, the side frames of the display panel need to be narrowed. For medium and small display panels, the above assembly method is not suitable for narrowing the side frames and cannot provide sufficient combination strength. Therefore, there is a demand to narrow the side frames and sustain the combination strength when the side frames are narrowed.

SUMMARY OF THE INVENTION

In order to resolve the above problems, the present invention provides a display apparatus and the combination method thereof, so as to effectively resolve the problems of manufacturing difficulty and insufficient combination strength when narrowing side frames, and avoid the glue overflow problem.

In accordance with a first embodiment of the present invention, a display apparatus includes a display panel and a light guide unit. The light guide unit includes a body portion and a support portion. The body portion includes a light outputting surface near the display panel, and the support portion is disposed on the edge of the light outputting surface to support the display panel. The support portion has an inclined surface, and at least one groove is formed between the inclined surface and the display panel for accommodating glue that combines the display panel and the light guide unit. In addition to being disposed in the groove, glue may be further disposed in a gap between the display panel, back bezel, and the light guide unit. The body portion and the support portion may be integrally formed.

In accordance with a second embodiment of the present invention, a manufacturing method for a display apparatus is disclosed. First, a display panel and a light guide unit are provided. The light guide unit includes a body portion and a support portion. The body portion has a light outputting surface, the support portion is disposed on the edge of the light outputting surface, and the support portion has an inclined surface. Next, the support portion is placed against the display panel to assemble the display panel and the light guide unit. The inclined surface of the support portion and the display panel form at least one groove therebetween, and the groove has an opening facing the outside of the light guide unit and the display panel. Glue is then filled into the groove to combine the display panel and the light guide unit.

In accordance with a third embodiment of the present invention, a manufacturing method for a display apparatus is disclosed. First, a light guide unit and a back bezel encompassing the light guide unit are provided. The light guide unit includes a body portion and a support portion, the body portion has a light outputting surface, and the support portion is disposed on the edge of the light outputting surface. The support portion has an inclined surface facing outwards. Glue is dispensed on a surface of the back bezel near the inclined surface, and then a display panel is disposed on the support portion to combine the display panel and the light guide unit. The inclined surface and the display panel form at least one groove therebetween, and the groove has an opening facing the back bezel. Accordingly, a portion of the glue dispensed on the back bezel is guided into the groove through the inclined surface.

According to the present invention, the inclined surface is formed on the support portion of the light guide unit, and is associated with the display panel to form a groove therebetween for accommodating the glue combining the display panel and the light guide unit. As a result, the combination strength is improved by increasing the amount of the glue, and the opening of the groove faces the outside of the light guide unit and the display panel, so as to effectively avoid the problem of overflow of glue in the display area.

DETAILED DESCRIPTION OF THE INVENTION

The making and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
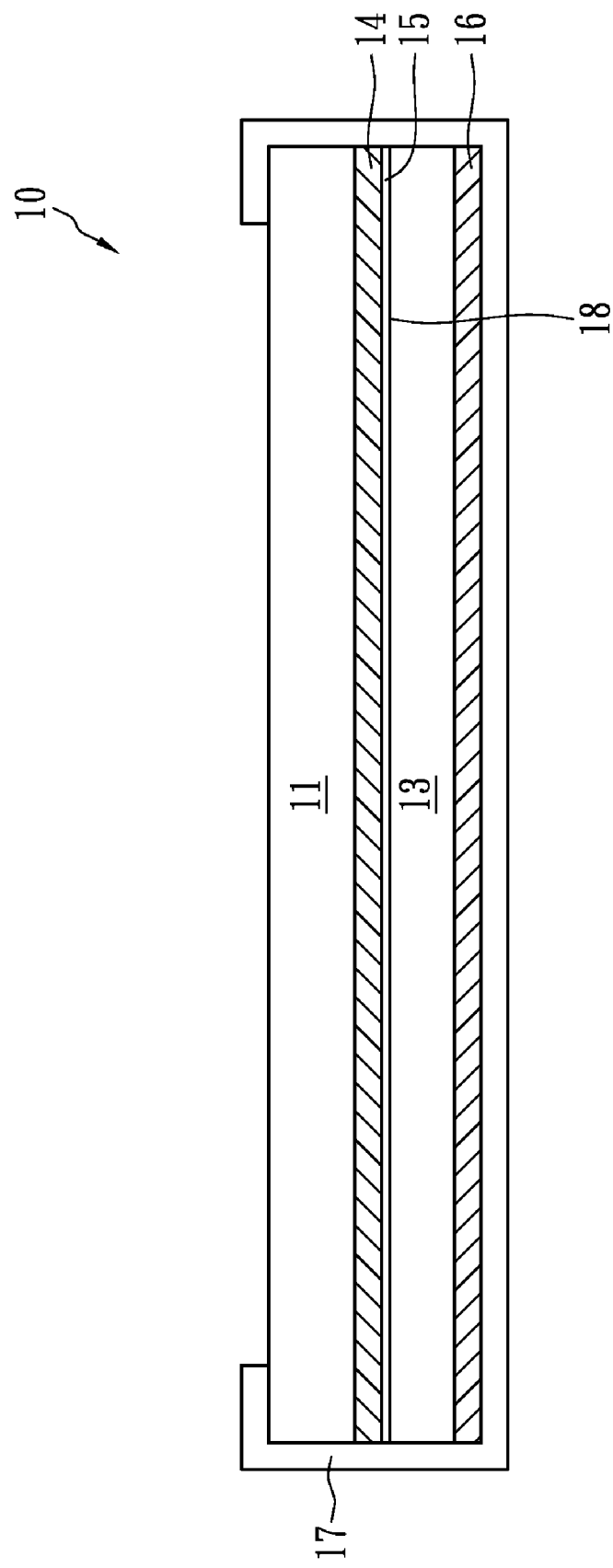
FIG. 1 shows a known display apparatus.
Figure 4:
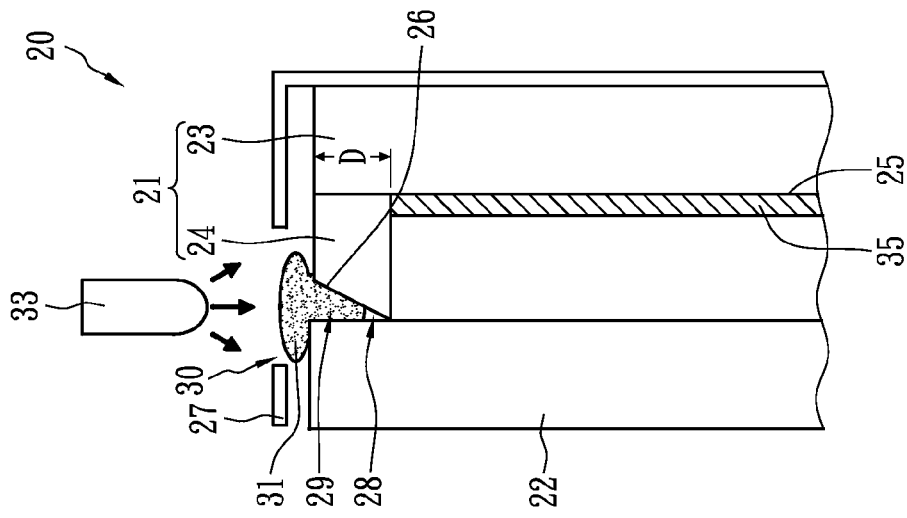
FIGS. 2 through 4 show the manufacturing process for the display apparatus in accordance with a first embodiment of the present invention.
Figure 3:
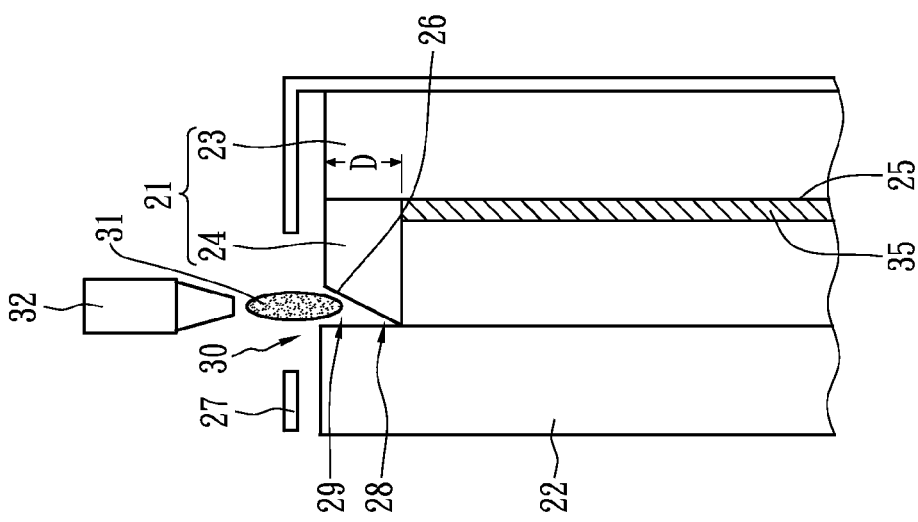
Figure 2:
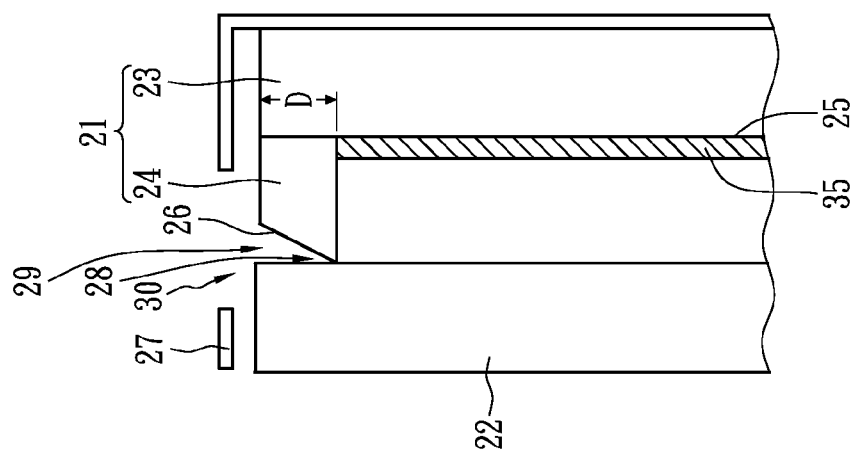

FIGS. 2 through 4 show the manufacturing process for the display apparatus in accordance with a first embodiment of the present invention. FIG. 2 shows a display panel 22 and a light guide unit 21, and the light guide unit 21 includes a body portion 23 and a support portion 24. The body portion 23 includes a light outputting surface 25, and the support portion 24 is disposed on the edge of the light outputting surface 25. The support portion 24 has an inclined surface 26. In an embodiment, the body portion 23 and the support portion 24 are integrally formed. The support portion 24 is placed against the display panel 22 to assemble the display panel 22 and the light guide unit 21. A groove 28 is formed between the inclined surface 26 and the display panel 22, and an opening 29 of the groove 28 faces the outer of the light guide unit 21 and the display panel 22. Moreover, at least one optical sheet 35 such as a diffusion sheet or a prism sheet is disposed among the display panel 22, the support portion 24 and the light outputting surface 25. In this embodiment, the back bezel 27 serving as a fixing apparatus is disposed at the outside of the rim of the display panel 22 and the light guide unit 21, and the back bezel 27 is provided with at least one hole 30 corresponding to the opening 29 for filling glue.

In FIG. 3, a dispensing apparatus 32, such as a dispenser, fills glue 31 into the groove 28 through the hole 30 by, for example, dispensing, so as to combine the display panel 22 and the light guide unit 21. Then, a UV-light apparatus 33, such as a high pressure mercury lamp, illuminates the glue 31 to cure the glue 31, thereby forming a display apparatus 20 as shown in FIG. 4. However, the method for curing the glue is not restricted to UV-lighting curing, for example, the glue can be naturally cured without lighting, or the glue can be thermally cured. The curing method is dependent on the features of the glue 31.

Figure 6:
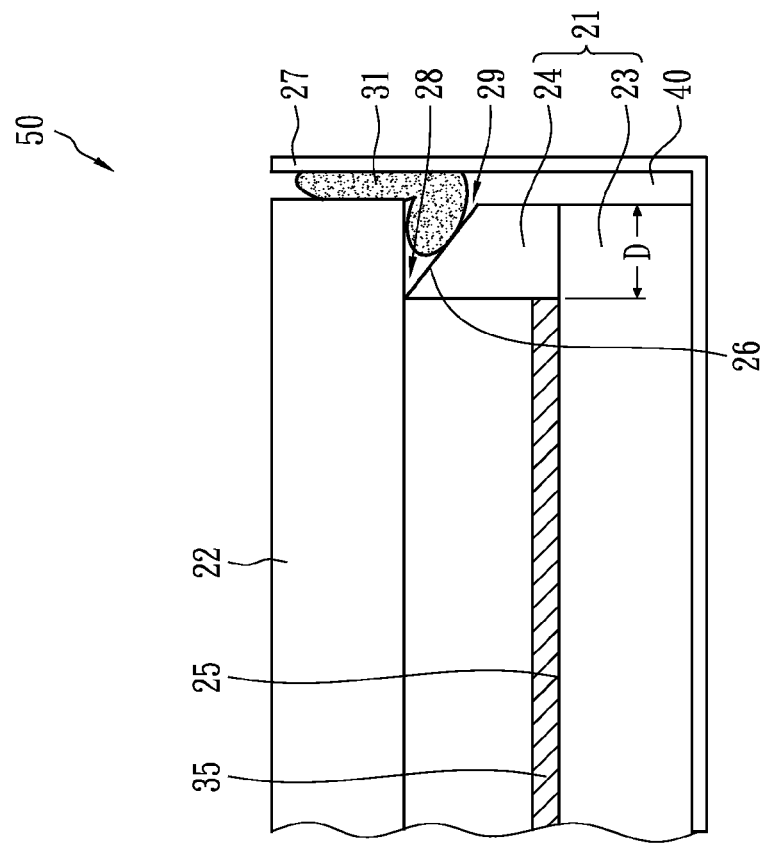
FIGS. 5 and 6 show the manufacturing process for the display apparatus in accordance with a second embodiment of the present invention.
Figure 5:
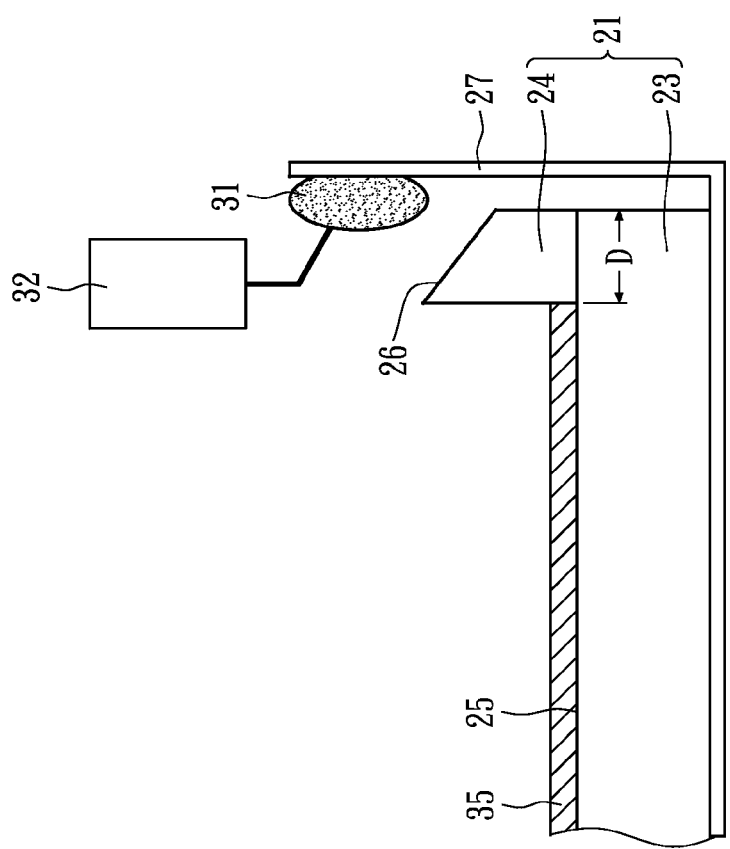

FIGS. 5 and 6 show the manufacturing process for the display apparatus in accordance with a second embodiment of the present invention. FIG. 5 shows a light guide unit 21 and a back bezel 27 encompassing the light guide unit 21. The light guide unit 21 includes a body portion 23 and a support portion 24. The body portion 23 includes a light outputting surface 25, the support portion 24 is disposed on the edge of the light outputting surface 25, and the support portion 24 has an inclined surface 26 facing outward. In an embodiment, the body portion 23 and the support portion 24 are integrally formed. The optical sheet 35 is disposed between the support portion 24 and the light outputting surface 25. A dispensing apparatus 32 such as a dispenser dispenses glue 31 on the surface of the bezel 27 near the inclined surface 26. The position of the glue 31 is preferably higher than or even with that of the inclined surface 26.

In FIG. 6, the display panel 22 is placed on the support portion 24 to combine the light guide unit 21 and display panel 22. As a result, a groove 28 is formed between the inclined surface 26 and the display panel 22, and an opening 29 of the groove 28 faces the back bezel 27. Accordingly, some of the glue 31 dispensed on the back bezel 27 is guided into the groove 28. After the light guide unit 21 and the display panel 22 are combined, there may be a gap 40 among the back bezel 27, the display panel 22 and the light guide unit 21, so that some glue 31 remains in the gap 40 among the back bezel 27, the display panel 22 and the light guide unit 21. Then, the glue 31 is cured by natural curing, thermal or UV-lighting as mentioned above to form a display apparatus 50 of the present invention.

Figure 6A:
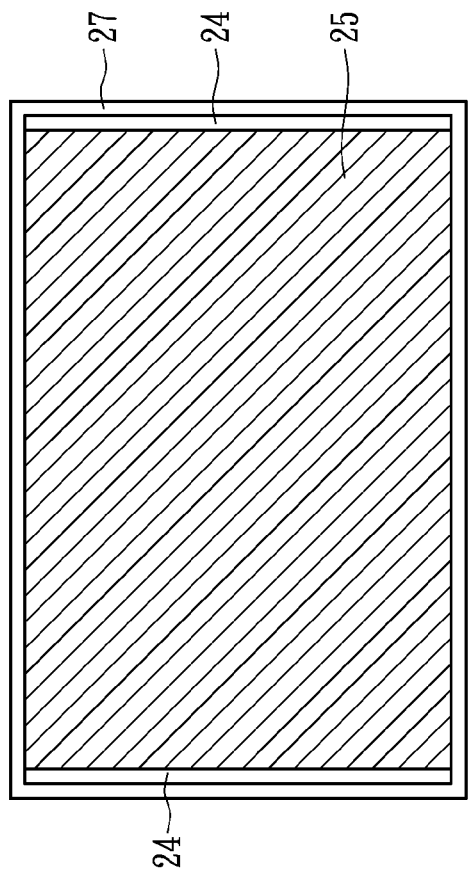
FIG. 6A and FIG. 6B show the support portion arrangements in accordance with some embodiments of the present invention.
Figure 6B:
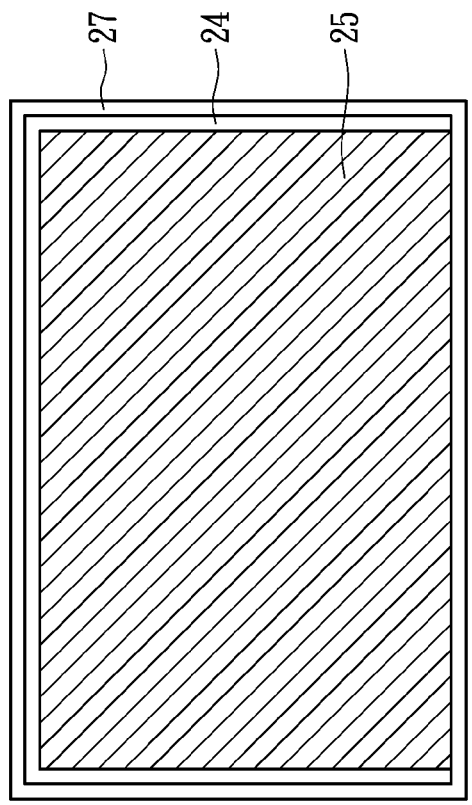

In summary, the display apparatus 20 or 50 combined by the method mentioned above includes a display panel 22 and a light guide unit 21. The light guide unit 21 includes the body portion 23 and the support portion 24. The body portion 21 includes a light outputting surface 25 near the display panel 22, and the support portion 24 is disposed on the edge of the light outputting surface 25 to support the display panel 22. Preferably, the body portion 23 and the support portion 24 are integrally formed. In an embodiment, the support portion 24 is strip-like and disposed at two or more sides of the light outputting surface 25. For example, the support portion 24 can be continuously or discontinuously formed at three sides of the light outputting surface 25. FIG. 6A shows an embodiment in which the support portion 24 is continuously formed at three sides of the light outputting surface 25. Alternatively, the support portion 24 can be continuously or discontinuously formed at two opposite sides of the light outputting surface 25. FIG. 6B shows an embodiment in which the support portion 24 is formed at two opposite sides of the light outputting surface 25. The form of the support portion 24 is not restricted, as long as it can support the display panel 22. The top of the support portion 24 near the display panel 22 has an inclined surface 26, and a groove 28 is formed between the inclined surface 26 and the display panel 22. The opening 29 of the groove 28 faces the outside of the display panel 22 and light guide unit 21 for accommodating glue 31 that combines the display panel 22 and the light guide unit 21. The back bezel 27 is formed at the outside of the rim of the display panel 22 and the light guide unit 21, and the opening 29 of the groove 28 faces the back bezel 27. The optical sheet 35 is disposed among the display panel 22, the support portion 24 and the light outputting surface 25.

Figure 7:
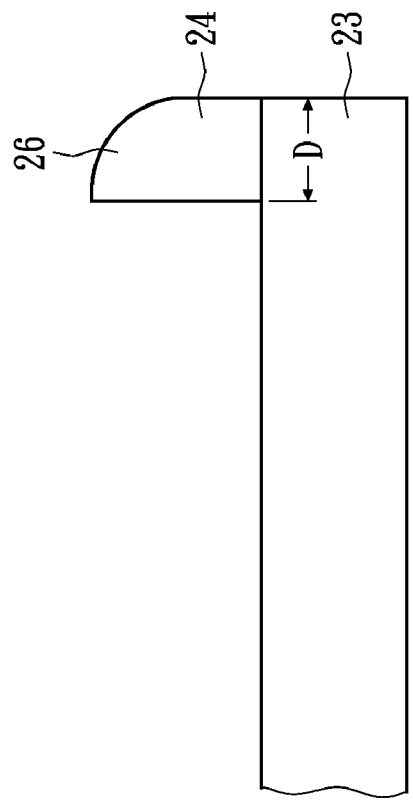
FIGS. 7 and 8 show inclined planes of a support portion of the display apparatus in accordance with the present invention.
Figure 8:
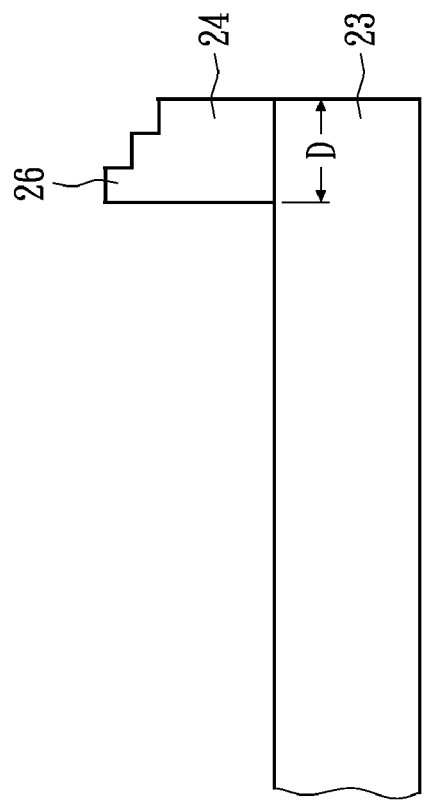

In an embodiment, an angle between the inclined surface 26 and the display panel 22 is between 5 and 85 degrees. The inclined surface 26 is not restricted to a plane, and can alternatively be a step-like or curved surface, as shown in FIGS. 7 and 8, respectively. The width D of the support portion 24 may be between 0.1 and 10 mm.

According to the first embodiment, the back bezel 27 has at least one hole 30 corresponding to the opening 29 of the groove 28, such that the glue 31 is filled into the groove 28 through the hole 30. In addition to being disposed in the groove 28, the glue 31 may be extended to the gap 40 between the display panel 22 and the back bezel 27 or between the light guide unit 21 and the back bezel 27, as mentioned in the second embodiment.

According to the present invention, the inclined surface is formed on the support portion of the light guide unit and is associated with the display panel to form a groove therebetween for accommodating the glue combining the display panel and the light guide unit. As a result, the combination strength is improved by increasing the amount of the glue, and the opening of the groove faces the outside of the light guide unit and the display panel, so as to effectively avoid the problem of overflow of glue in the display area.

Display apparatuses are subjected to corner peeling testing. For the display apparatus combined by traditional tape method, peeling occurs at a force of 3.9N; however, peeling does not occur at a force of 6N for the display apparatus combined by the method of the present invention. Clearly, the combination strength of the display panel and the light guide unit can be increased by the method of the present invention.

The above-described embodiments of the present invention are intended to be illustrative only. Numerous alternative embodiments may be devised by those skilled in the art without departing from the scope of the following claims.

What is claimed is:

1. A display apparatus, comprising:
a display panel;

a light guide unit comprising a body portion and a support portion, the body portion having a light outputting surface near the display panel, the support portion being placed on an edge of the light outputting surface to support the display panel, the support portion having an inclined surface, and at least one groove being formed between the inclined surface and the display panel for accommodating glue that combines the display panel and the light guide unit.

2. The display apparatus of claim 1, wherein an opening of the groove faces the outside of the display panel and the light guide unit.

3. The display apparatus of claim 1, wherein the inclined surface and the display panel form an angle of 5 to 85 degrees.

4. The display apparatus of claim 1, wherein the inclined surface is step-like.

5. The display apparatus of claim 1, wherein the inclined surface is curved.

6. The display apparatus of claim 1, further comprising a back bezel disposed at the outside of a rim of the display panel and the light guide unit, and the groove having an opening facing the back bezel.

7. The display apparatus of claim 6, wherein the back bezel has at least one hole corresponding to the opening of the groove through which glue is filled into the groove.

8. The display apparatus of claim 6, wherein the glue further extends to a gap among the display panel, the back bezel and the light guide unit.

9. The display apparatus of claim 1, wherein the body portion and the support portion are integrally formed.

10. The display apparatus of claim 1, wherein the support portion has a width between 0.1 and 10 mm.

11. The display apparatus of claim 1, wherein the support portion is strip-like and disposed on at least two sides of the light outputting surface.

12. The display apparatus of claim 1, further comprising at least one optical sheet disposed among the display panel, the support portion and the light outputting surface.

13. A manufacturing method for a display apparatus, comprising the steps of:
   providing a display panel and a light guide unit, wherein the light guide unit comprises a body portion and a support portion, the body portion has a light outputting surface, the support portion is disposed on an edge of the light outputting surface, and the support portion has an inclined surface;
   placing the support portion against the display panel to assemble the display panel and the light guide unit, wherein the inclined surface of the support portion and the display panel form at least one groove therebetween, and the groove has an opening facing the outside of the light guide unit and the display panel; and
   filling glue into the groove to combine the display panel and the light guide unit.

14. The manufacturing method of claim 13, further comprising a step of providing a back bezel that is disposed at the outside of a rim of the display panel and the light guide unit and has at least one hole corresponding to the opening, wherein the glue is filled into the groove through the hole to combine the display panel and the light guide unit.

15. The manufacturing method of claim 13, wherein the glue is filled into the groove by dispensing.

16. A manufacturing method for a display apparatus, comprising the steps of:
   providing a light guide unit and a back bezel encompassing the light guide unit, wherein the light guide unit comprises a body portion and a support portion, the body portion has a light outputting surface, and the support portion is disposed on an edge of the light outputting surface, and the support portion has an inclined surface facing outwards;
   dispensing glue on a surface of the back bezel near the inclined surface; and
   disposing a display panel on the support portion to combine the display panel and the light guide unit, wherein the inclined surface and the display panel form at least one groove therebetween, the groove has an opening facing the back bezel, and a portion of the glue dispensed on the back bezel is guided into the groove through the inclined surface.

17. The manufacturing method of claim 16, wherein the glue is dispensed at a position higher than or even with the inclined surface.

18. The manufacturing method of claim 16, wherein a portion of the glue exists in a gap between the display panel and the back bezel after combining the light guide unit and the display panel.

19. The manufacturing method of claim 16, wherein a portion of the glue exists in a gap between the light guide unit and the back bezel after combining the light guide unit and the display panel.

* * * * *